US009521276B2

(12) United States Patent
Short et al.

(10) Patent No.: US 9,521,276 B2
(45) Date of Patent: Dec. 13, 2016

(54) PORTABLE PROJECTION CAPTURE DEVICE

(75) Inventors: David Bradley Short, San Diego, CA (US); Geoffrey C Mayne, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 121 days.

(21) Appl. No.: 14/233,893

(22) PCT Filed: Sep. 29, 2011

(86) PCT No.: PCT/US2011/053947
§ 371 (c)(1),
(2), (4) Date: Jan. 21, 2014

(87) PCT Pub. No.: WO2013/019252
PCT Pub. Date: Feb. 7, 2013

(65) Prior Publication Data
US 2014/0176735 A1    Jun. 26, 2014

(30) Foreign Application Priority Data
Aug. 2, 2011   (WO) ................. PCT/US2011/046253

(51) Int. Cl.
*H04N 5/225* (2006.01)
*H04N 1/00* (2006.01)
(Continued)

(52) U.S. Cl.
CPC .......... *H04N 1/00267* (2013.01); *G03B 15/05* (2013.01); *G03B 17/54* (2013.01);
(Continued)

(58) Field of Classification Search
CPC ...................................................... G03B 17/54
(Continued)

(56) References Cited

U.S. PATENT DOCUMENTS

| 4,986,651 A | 1/1991 | Vanderwerf |
| 5,511,146 A | 4/1996 | Wellner |

(Continued)

FOREIGN PATENT DOCUMENTS

| CN | 1378741 | 11/2002 |
| CN | 101840135 | 9/2010 |

(Continued)

OTHER PUBLICATIONS

Extended European Search Report, European Application No. 11870314.9, Date: Mar. 20, 2015, pp. 1-8.

(Continued)

*Primary Examiner* — Anthony J Daniels
(74) *Attorney, Agent, or Firm* — HP Inc Patent Department

(57) ABSTRACT

In one example, a portable projection capture device includes a digital camera and a projector mounted below the camera. The camera defines a capture area on a work surface within which the camera is configured to capture still and video images. The projector defines a display area on the work surface overlapping the capture area. The projector is configured to project into the capture area both images captured by the camera and white light for illuminating real objects in the capture area for camera image capture.

12 Claims, 15 Drawing Sheets

(51) Int. Cl.
| | | |
|---|---|---|
| H04N 1/028 | (2006.01) | |
| H04N 1/195 | (2006.01) | |
| G03B 15/05 | (2006.01) | |
| G03B 17/54 | (2006.01) | |
| G03B 21/28 | (2006.01) | |
| G06F 3/042 | (2006.01) | |
| H04N 5/33 | (2006.01) | |

(52) U.S. Cl.
CPC ............ *G03B 21/28* (2013.01); *G06F 3/0425* (2013.01); *H04N 1/0044* (2013.01); *H04N 1/00493* (2013.01); *H04N 1/00496* (2013.01); *H04N 1/00562* (2013.01); *H04N 1/02815* (2013.01); *H04N 1/19594* (2013.01); *H04N 5/2256* (2013.01); *H04N 5/33* (2013.01); *G03B 2215/0567* (2013.01); *H04N 2201/0089* (2013.01)

(58) Field of Classification Search
USPC ..................................................... 348/333.1
See application file for complete search history.

(56) References Cited

U.S. PATENT DOCUMENTS

| | | | |
|---|---|---|---|
| 6,067,112 A * | 5/2000 | Wellner | G06F 3/033 348/136 |
| 6,431,711 B1 | 8/2002 | Pinhanez | |
| 6,840,627 B2 | 1/2005 | Olbrich | |
| 6,965,460 B1 | 11/2005 | Gann et al. | |
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl et al. | |
| 7,268,956 B2 | 9/2007 | Mandella et al. | |
| 7,432,917 B2 | 10/2008 | Wilson et al. | |
| 7,474,809 B2 | 1/2009 | Carl et al. | |
| 7,589,747 B2 | 9/2009 | Matsui et al. | |
| 7,626,578 B2 | 12/2009 | Wilson et al. | |
| 7,729,515 B2 | 6/2010 | Mandella et al. | |
| 7,826,641 B2 | 11/2010 | Mandella et al. | |
| 7,843,470 B2 | 11/2010 | Bannai et al. | |
| 7,959,300 B2 | 6/2011 | Hirahara et al. | |
| 7,961,909 B2 | 6/2011 | Mandella et al. | |
| 2002/0186221 A1 | 12/2002 | Bell | |
| 2003/0007135 A1* | 1/2003 | Sciammarella et al. | 353/98 |
| 2003/0092470 A1 | 5/2003 | Kurakane | |
| 2003/0095200 A1* | 5/2003 | Nagano | 348/373 |
| 2004/0095562 A1 | 5/2004 | Moffatt | |
| 2005/0089322 A1 | 4/2005 | Uenaka | |
| 2005/0168437 A1 | 8/2005 | Carl et al. | |
| 2006/0010400 A1 | 1/2006 | Dehlin et al. | |
| 2006/0126128 A1 | 6/2006 | Ahmed et al. | |
| 2007/0201863 A1* | 8/2007 | Wilson | G03B 21/008 396/429 |
| 2008/0030461 A1 | 2/2008 | Matsui et al. | |
| 2008/0094588 A1 | 4/2008 | Cole et al. | |
| 2008/0192017 A1 | 8/2008 | Hildebrandt et al. | |
| 2008/0317332 A1* | 12/2008 | Ivanov et al. | 382/154 |
| 2009/0115721 A1 | 5/2009 | Aull et al. | |
| 2009/0207383 A1* | 8/2009 | Hirahara | H04N 5/74 353/69 |
| 2009/0262098 A1 | 10/2009 | Yamada | |
| 2010/0017722 A1 | 1/2010 | Cohen | |
| 2010/0157388 A1 | 6/2010 | Pishdadian et al. | |
| 2010/0188474 A1 | 7/2010 | Robinson et al. | |
| 2010/0188562 A1* | 7/2010 | Yamakose | H04N 1/0402 348/373 |
| 2010/0238141 A1 | 9/2010 | Kanayama et al. | |
| 2010/0271394 A1 | 10/2010 | Howard | |
| 2010/0299103 A1 | 11/2010 | Yoshikawa | |
| 2011/0025650 A1 | 2/2011 | Joscelyne | |
| 2011/0063256 A1 | 3/2011 | Ye et al. | |
| 2011/0169778 A1 | 7/2011 | Nungester et al. | |
| 2011/0227915 A1 | 9/2011 | Mandella et al. | |
| 2012/0038549 A1 | 2/2012 | Mandella et al. | |
| 2012/0320157 A1* | 12/2012 | Junuzovic et al. | 348/46 |
| 2013/0194418 A1 | 8/2013 | Gonzalez-Banos et al. | |

FOREIGN PATENT DOCUMENTS

| | | |
|---|---|---|
| EP | 0840200 A2 | 5/1998 |
| JP | H10-191155 A | 7/1998 |
| JP | 10222436 | 8/1998 |
| JP | 2003-276399 A | 9/2003 |
| JP | 2004192623 A | 7/2004 |
| JP | 2005-250392 A | 9/2005 |
| JP | 2005-354306 A | 12/2005 |
| JP | 2006-004010 A | 1/2006 |
| JP | 2006-093803 A | 4/2006 |
| JP | 2006-094445 A | 4/2006 |
| JP | 2009-239598 A | 10/2009 |
| JP | 2011081556 | 4/2011 |
| KR | 102011000370 | 1/2011 |

OTHER PUBLICATIONS

Office Action, Japanese Application No. 2014-523905, Date: Feb. 23, 2015, pp. 1-6.

Gao, Rui et al; Microsoft Research-Mobile Surface; Microsoft Research; 2010; http://research.microsoft.com/en-us/projects/mobilesurface/.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research-IllumiShare; Microsoft Research; 2012; http://delivery.acm.org/10.1145/2210000/2208333/p1919-junozovic.pdf?ip=15.219.153.76&id=2208333&acc=ACTIVE%20SERVICE&key=C2716FEBFA981EF15-3FE223D54A46A411F9E1F05F1DA6F38&CFID=271558808&CFTOKEN=96334302&_acm_=1387226323_00af7aa5e-159c7c67d724c49ef01bacf.

Kane, S.K. et al., Bonfire: a Nomadic System for Hybrid Laptop-tabletop Interaction, (Research Paper), Oct. 4-7, 2009, pp. 129-138.

Wilson, Andrew D.; Using a Depth Camera As a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

(56) References Cited

OTHER PUBLICATIONS

Melanson, Donald; Wiimote Repurposed for Multi-Point Interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; UIST'10: Oct. 3, 2010: New York, New York; http://research.microsoft.com/en-us/um/people/awilson/publications/WilsonUIST2010/WilsonUIST2010.html.

Yuanyuan Ding et al; Catadioptric Projectors; http://www.eecis.udel.edu/~jye/lab_research/09/cprojector.pdf.

\* cited by examiner

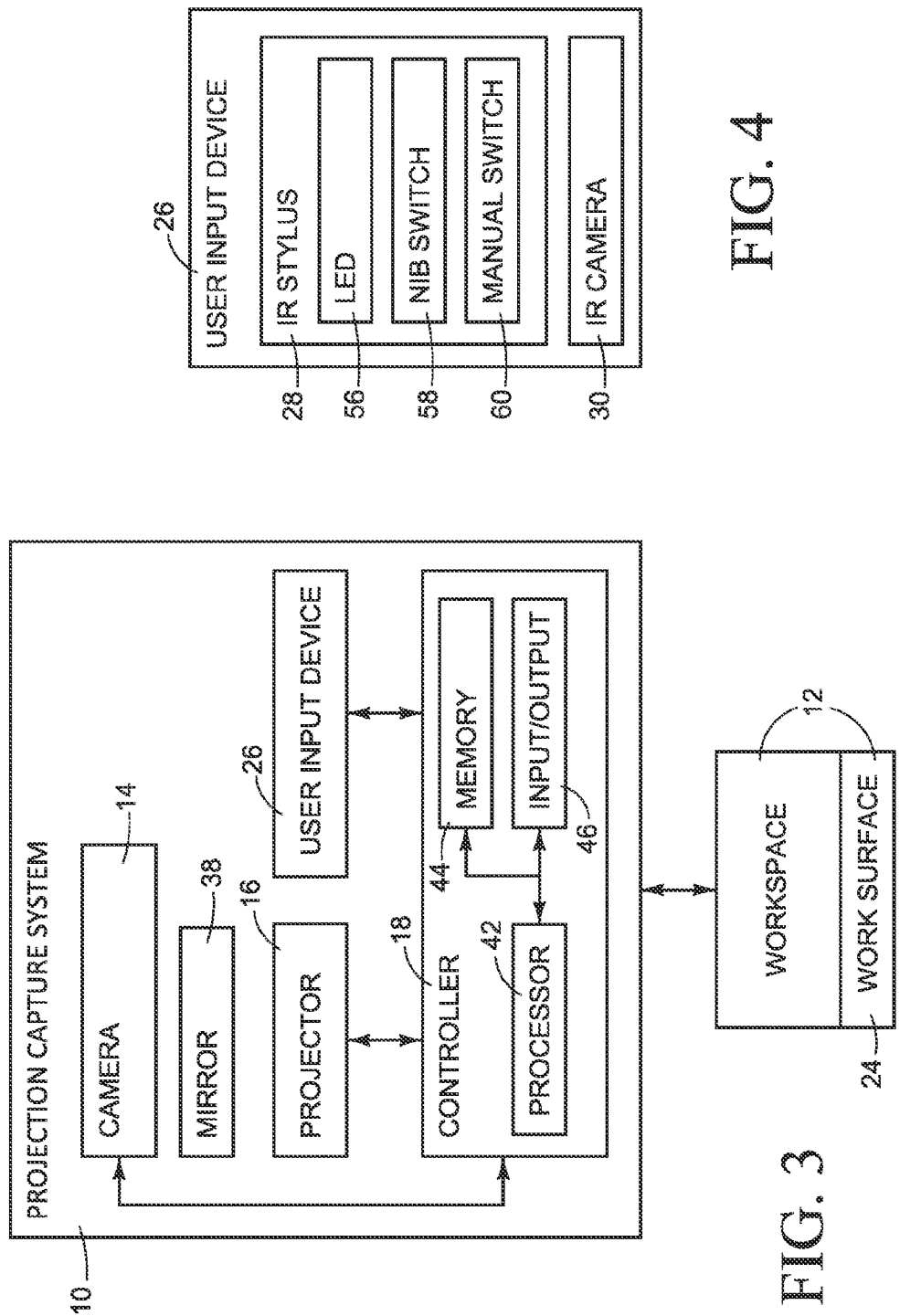

PORTABLE PROJECTION CAPTURE DEVICE

BACKGROUND

A new projection capture system has been developed in an effort to improve digitally capturing images of documents and other objects and in an effort to improve the interactive user experience working with real objects and projected objects on a physical work surface.

DRAWINGS

FIGS. 1A and 1B are perspective, exterior views illustrating a new projection capture system, according to one example of the invention. In FIG. 1A, the image of a two dimensional object (a hardcopy photograph) has been captured and displayed. In FIG. 1B, the image of a three dimensional object (a cube) has been captured and displayed.

FIG. 3 is a block diagram of the projection capture system shown in FIG. 2.

FIG. 4 is block diagram illustrating one example of a user input device in the system shown in FIGS. 2 and 3.

The same part numbers are used to designate the same or similar parts throughout the figures.

DESCRIPTION

The examples shown in the figures and described below illustrate but do not limit the invention, which is defined in the Claims following this Description.

In one example of the new projection capture system, a digital camera and a projector are housed together in a portable device in which the projector functions both to illuminate objects in the camera capture area for image capture and to project images captured by the camera into a display area that overlaps the capture area. In one example, the projector is positioned below the camera and configured to project light into the display area along a light path that is longer than a height of the camera above the work surface, for instance using a mirror positioned above the projector to reflect light from the projector into the display area. The projector is not limited to displaying images captured by the camera. The projector may also display, for example, digital content acquired from external sources including content acquired from other projection capture devices linked in a collaborative environment.

Figure 1A:
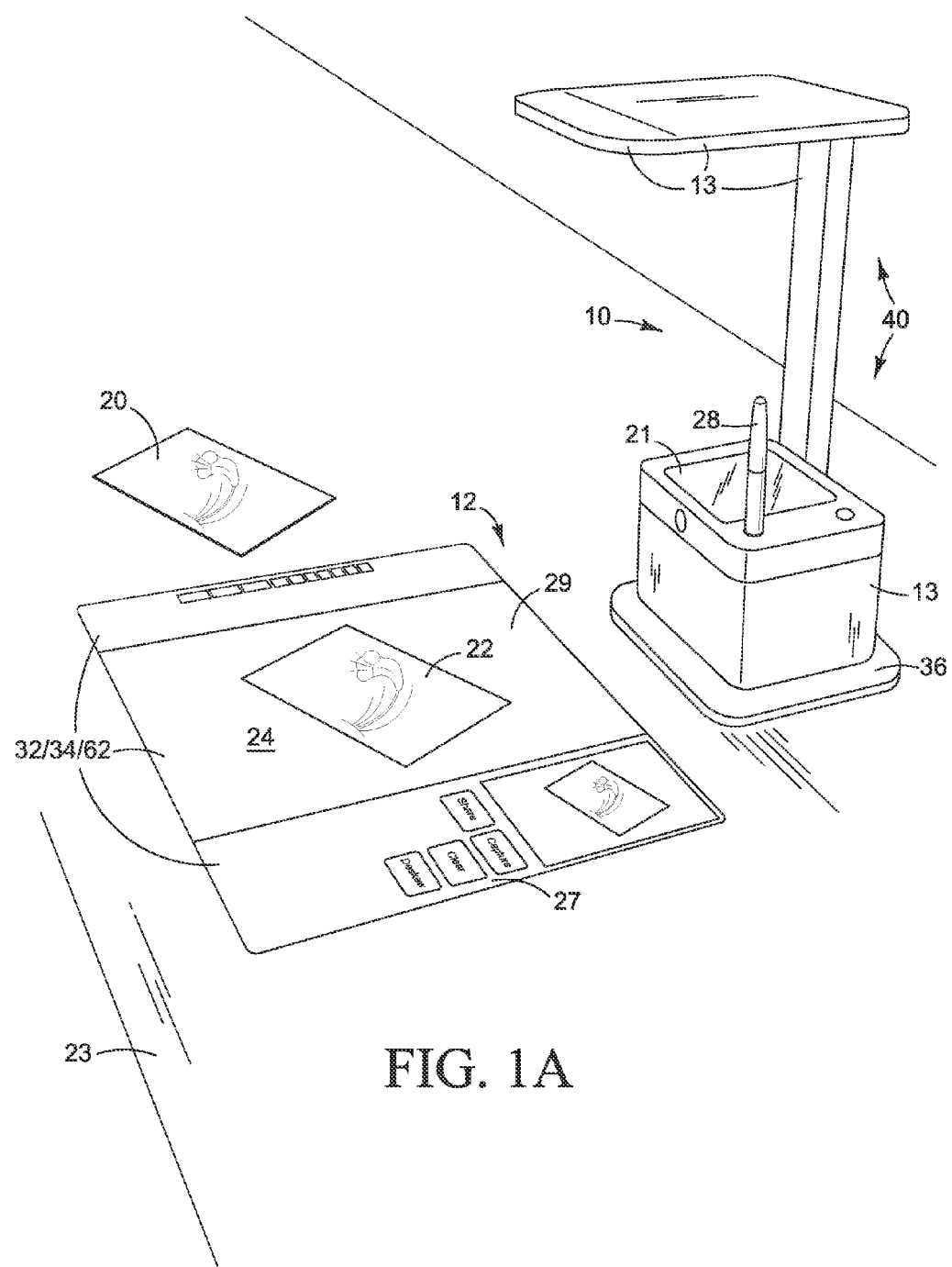
Figure 1B:
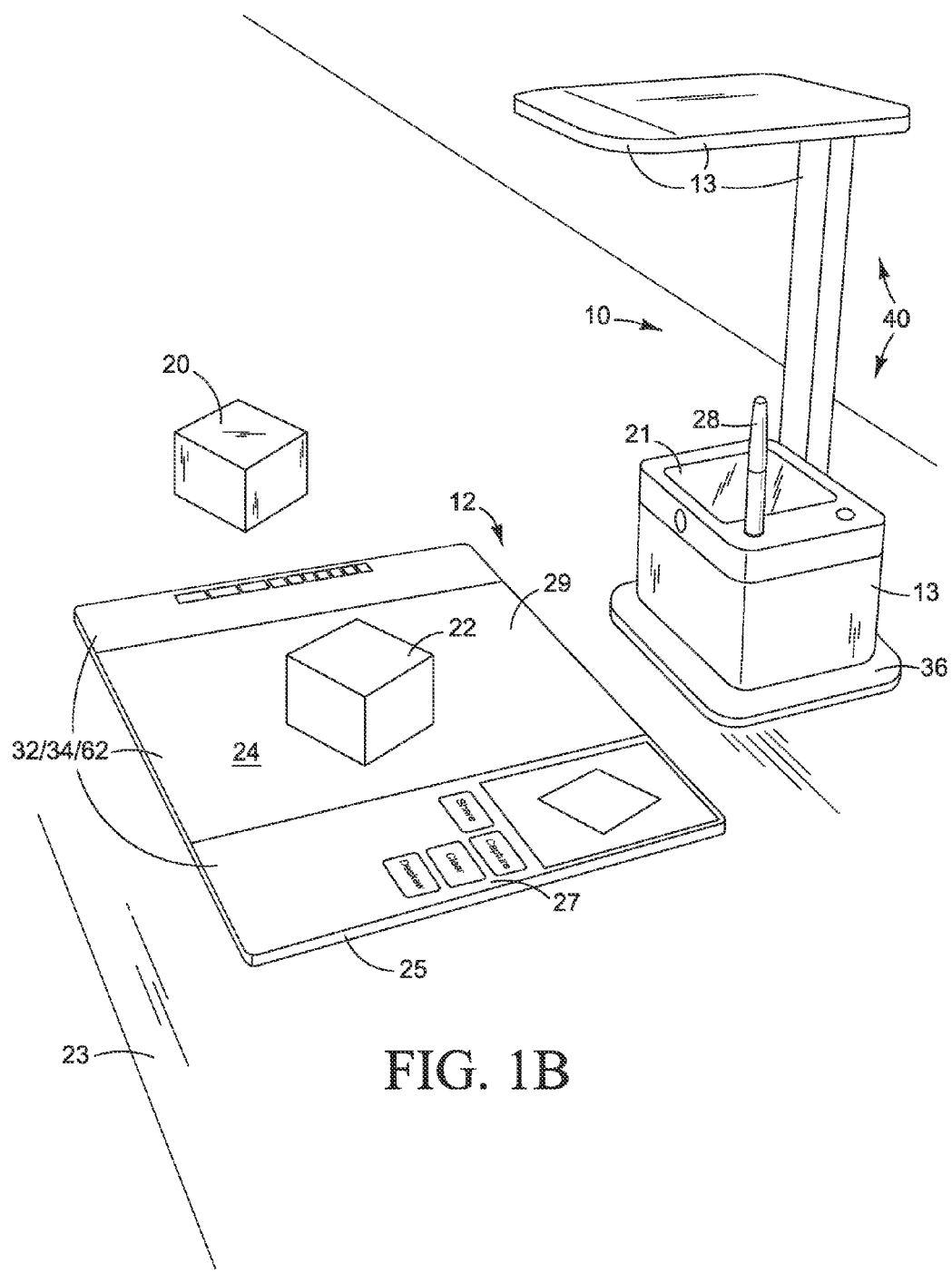
Figure 2:
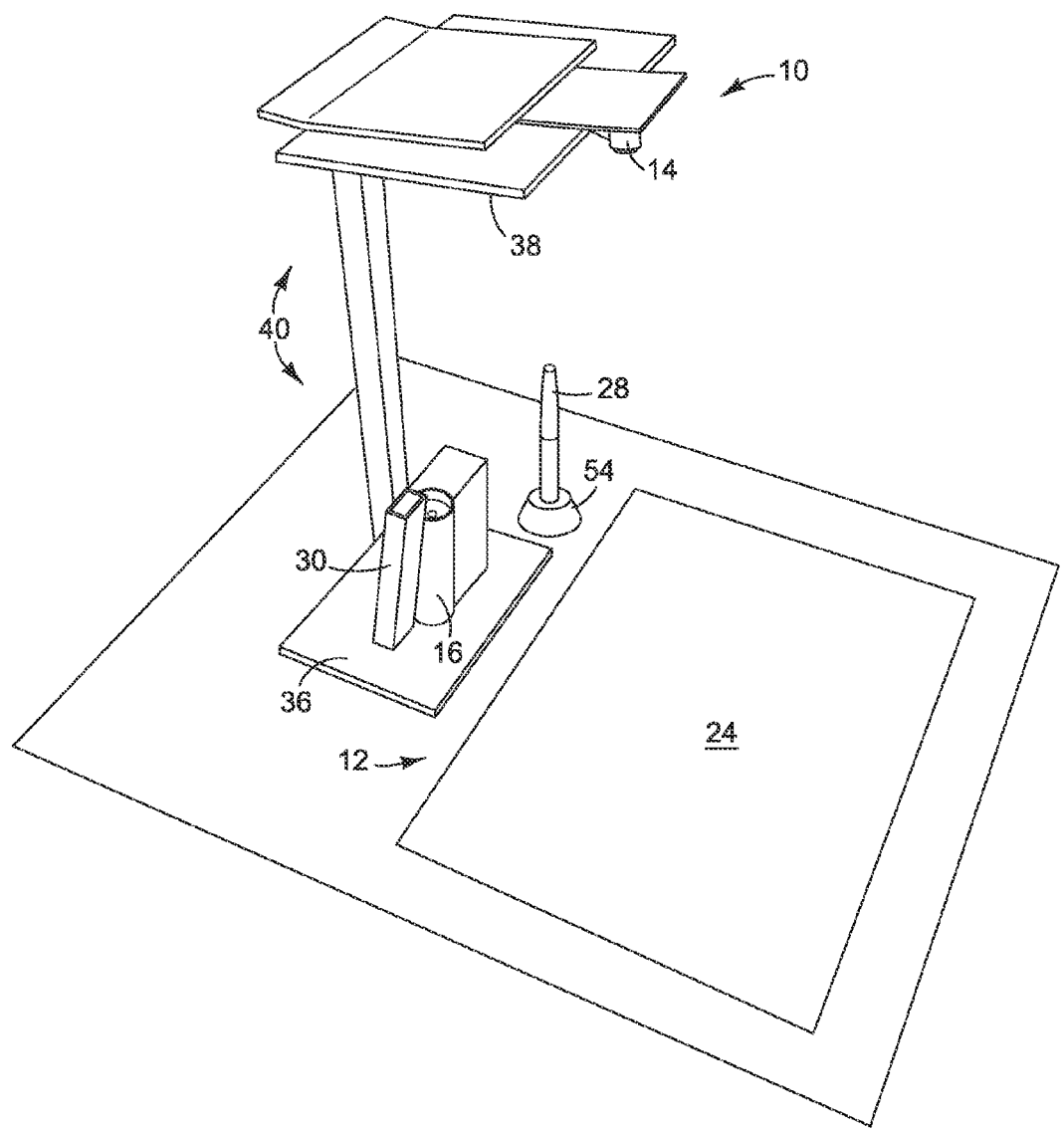
FIG. 2 is a perspective, interior view illustrating a projection capture system, such as the system of FIG. 1, according to one example of the invention.

FIGS. 1A and 1B are perspective, exterior views illustrating one example of a new projection capture system 10 and an interactive workspace 12 associated with system 10. FIG. 2 is a perspective view illustrating one example of a projection capture system 10 with exterior housing 13 removed. FIG. 3 is a block diagram of system 10 shown in FIG. 2. Referring to FIGS. 1A, 1B, 2, and 3, projection capture system 10 includes a digital camera 14, a projector 16, and a controller 18. Camera 14 and projector 16 are operatively connected to controller 18 for camera 14 capturing an image of an object 20 in workspace 12 and projector 16 projecting the object image 22 into workspace 12 and, in some examples, for camera 14 capturing an image of the projected object image 22. The lower part of housing 13 includes a transparent window 21 over projector 16 (and infrared camera 30).

In the example shown in FIG. 1A, a two dimensional object 20 (a hardcopy photograph) placed onto a work surface 24 in workspace 12 has been photographed by camera 14 (FIG. 2), object 20 removed to the side of workspace 12, and object image 22 projected onto a work surface 24 where it can be photographed by camera 14 (FIG. 2) and/or otherwise manipulated by a user. In the example shown in FIG. 13, a three dimensional object 20 (a cube) placed onto work surface 24 has been photographed by camera 14 (FIG. 2), object 20 removed to the side of workspace 12, and object image 22 projected into workspace 12 where it can be photographed by camera 12 and/or otherwise manipulated by a user.

System 10 also includes a user input device 26 that allows the user to interact with system 10. A user may interact with object 20 and/or object image 22 in workspace 12 through input device 26, object image 22 transmitted to other workspaces 12 on remote systems 10 (not shown) for collaborative user interaction, and, if desired, object image 22 maybe photographed by camera 14 and re-projected into local and/or remote workspaces 12 for further user interaction. In FIG. 1A, work surface 24 is part of the desktop or other underlying support structure 23. In FIG. 1B, work surface 24 is on a portable mat 25 that may include touch sensitive areas. In FIG. 1A, for example, a user control panel 27 is projected on to work surface 24 while in FIG. 1B control panel 27 may be embedded in a touch sensitive area of mat 25. Similarly, an A4, letter or other standard size document placement area 29 may be projected onto work surface 24 in FIG. 1A or printed on a mat 25 in FIG. 1B. Of course, other configurations for work surface 24 are possible. For example, it may be desirable in some applications for system 10 to use an otherwise blank mat 25 to control the color, texture, or other characteristics of work surface 24, and thus control panel 27 and document placement area 29 may be projected on to the blank mat 25 in FIG. 1B just as they are projected on to the desktop 23 in FIG. 1A.

In the example shown in FIG. 4, user input device 26 includes an infrared digital stylus 28 and an infrared camera 30 for detecting stylus 28 in workspace 12. Although any suitable user input device may be used, a digital stylus has the advantage of allowing input in three dimensions, including along work surface 24, without a sensing pad or other special surface. Thus, system 10 can be used on a greater variety of work surfaces 24. Also, the usually horizontal orientation of work surface 24 makes it useful for many common tasks. The ability to use traditional writing instruments on work surface 24 is advantageous over vertical or mobile computing interfaces. Projecting an interactive display on to a working desktop mixes computing tasks with the standard objects that may exist on a real desktop, thus physical objects can coexist with projected objects. As such, the comfort of using real writing instruments as well as their digital counterparts (like stylus 28) is an effective use model. A three-dimensional pad-free digital stylus enables annotation on top of or next to physical objects without having a sensing pad get in the way of using traditional instruments on work surface 24.

In one example implementation for system 10, projector 16 serves as the light source for camera 14. Camera capture area 32 (FIG. 12) and projector display area 34 (FIG. 14) overlap on work surface 24. Thus, a substantial operating efficiency can be gained using projector 16 both for projecting images and for camera lighting. The light path from projector 16 through workspace 12 to work surface 24 should be positioned with respect to camera 14 to enable user display interaction with minimal shadow occlusion while avoiding specular glare off work surface 24 and objects in workspace 12 that would otherwise blind camera 14. The system configuration described below avoids the glare induced artifacts that would result from a conventional camera lighting geometry while still maintaining a sufficiently steep incident angle for the projector light path desired for proper illumination and projection of two and three dimensional objects in workspace 12.

Ideally, projector 16 would be mounted directly over workspace 12 at an infinite height above work surface 24 to insure parallel light rays. This configuration, of course, is not realistic. Even if projector 16 was moved down to a realistic height above work surface 24 (but still pointing straight down), the projectors light would be reflected off glossy and semi-glossy surfaces and objects straight back into camera 14, creating a blinding specular glare. Thus, the glare spot must be moved out of camera capture area 32. (Specular glare refers to glare from specular reflection in which the angle of incidence of the incident light ray and the angle of reflection of the reflected light ray are equal and the incident, reflected, and normal directions are coplanar.)

Figure 6:
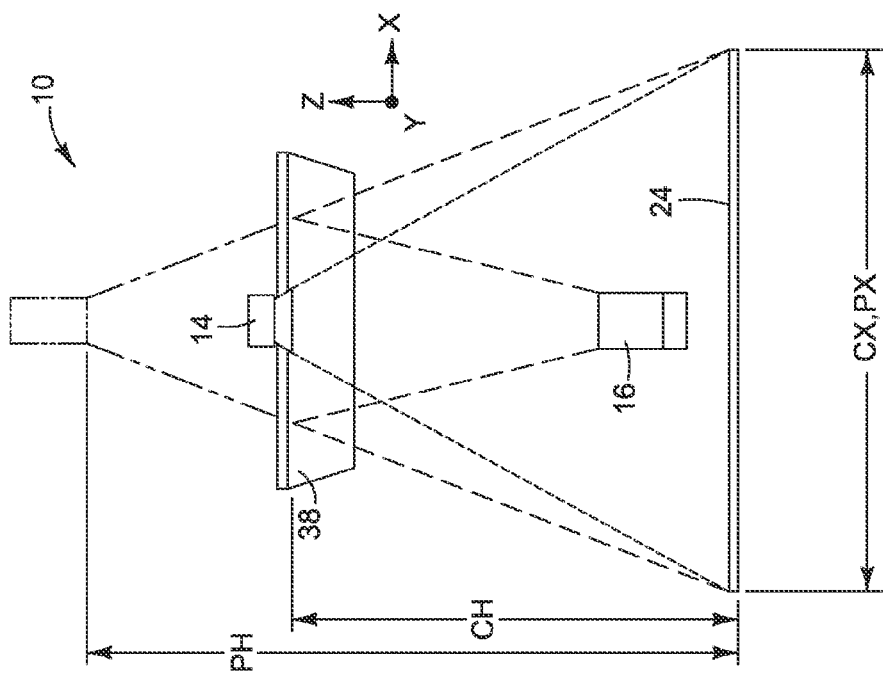
FIGS. 5 and 6 are side and front elevation views, respectively, illustrating the positioning of the camera and the projector in the projection capture system shown in FIGS. 2 and 3.
Figure 5:
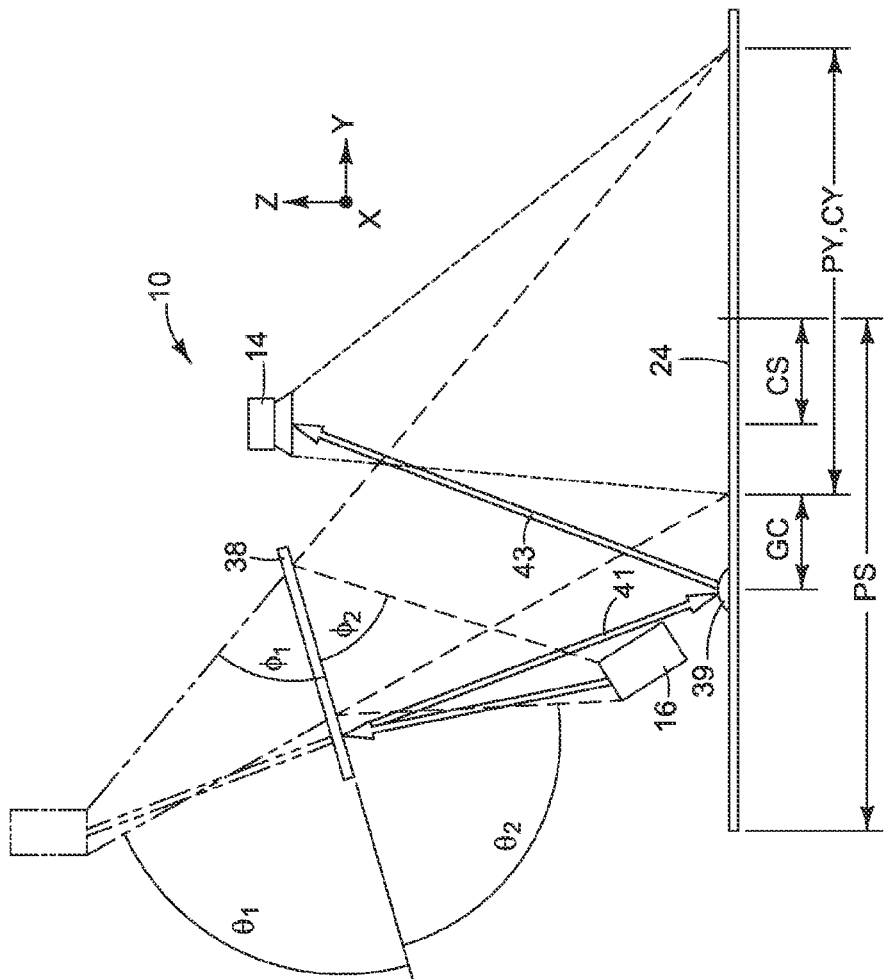

To achieve a commercially reasonable solution to this problem of specular glare, camera 14 and projector 16 are shifted away from the center of capture and display areas 32, 34 and projector 16 is positioned low, near base 36, as shown in FIGS. 5 and 6, and a fold mirror 38 is introduced into the projector's light path to simulate a projector position high above work surface 24. The simulated position of projector 16 and the corresponding light path above mirror 38 are shown in phantom lines in FIGS. 5 and 6. However, before describing the configuration shown in FIGS. 5 and 6 in more detail, it is helpful to consider the problems associated with other possible configurations for moving the glare spot out of camera capture area 32.

Figure 7:
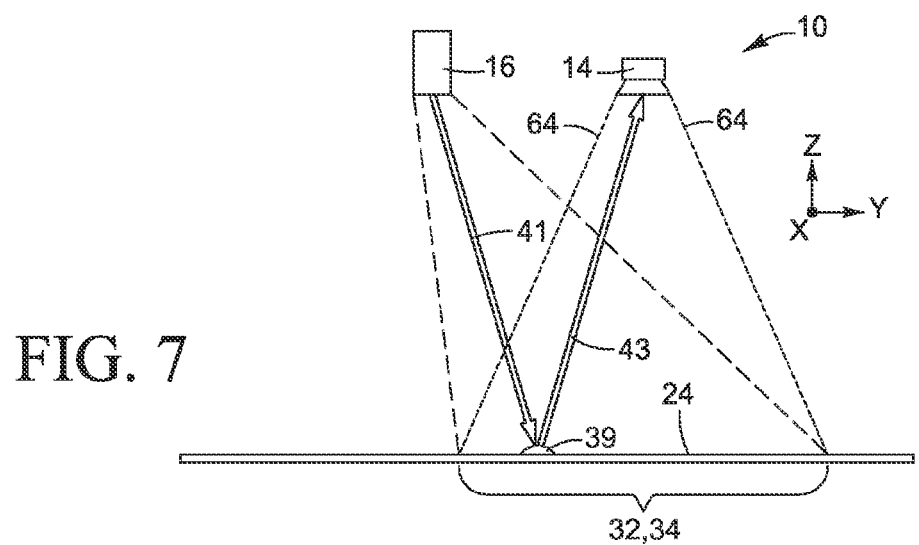
FIGS. 7-11 are a progression of side elevation views showing various positions for the projector and the camera in a projection capture system, illustrating some of the problems associated with moving the glare spot out of camera capture area.
Figure 8:
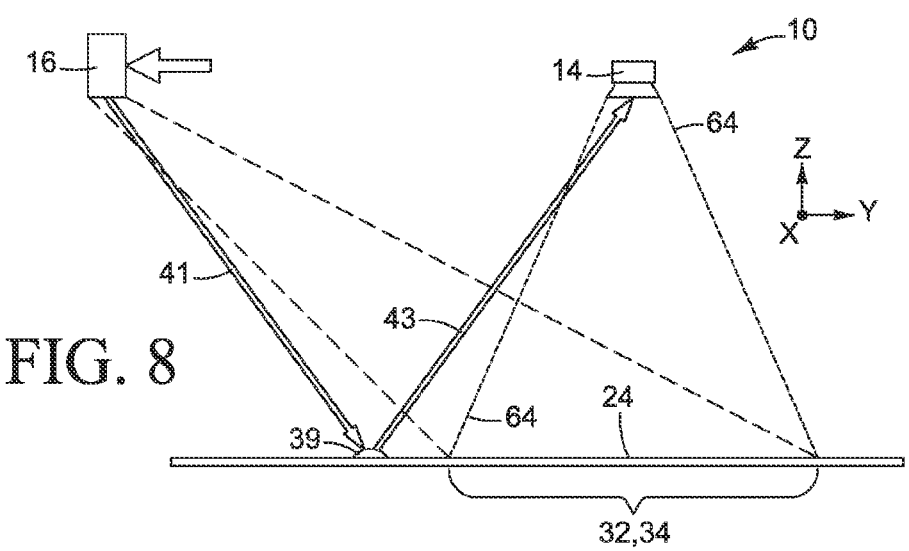

In FIG. 7, camera 14 is positioned at the center of capture area 32 with an overhead projector 16 slightly off center so that camera 14 does not block the projector light path. In the configuration of FIG. 7, the specular glare spot 39 (at the intersection of incident light ray 41 and reflected light ray 43) falls within capture area 32 and, thus, will blind camera 14 to some objects and images in capture area 32. In addition, for the configuration shown in FIG. 7, where camera 14 and projector 16 are both positioned high above the base, system 10 would be top heavy and, thus, not desirable for a commercial product implementation. If projector 16 is positioned to the side the distance needed to move glare spot 39 out of camera capture area 32, as shown in FIG. 8, the corresponding projector lens offset required would not be feasible. Also, any product implementation for the configuration of system 10 shown in FIG. 8 would be undesirably broad and top heavy.

Figure 9:
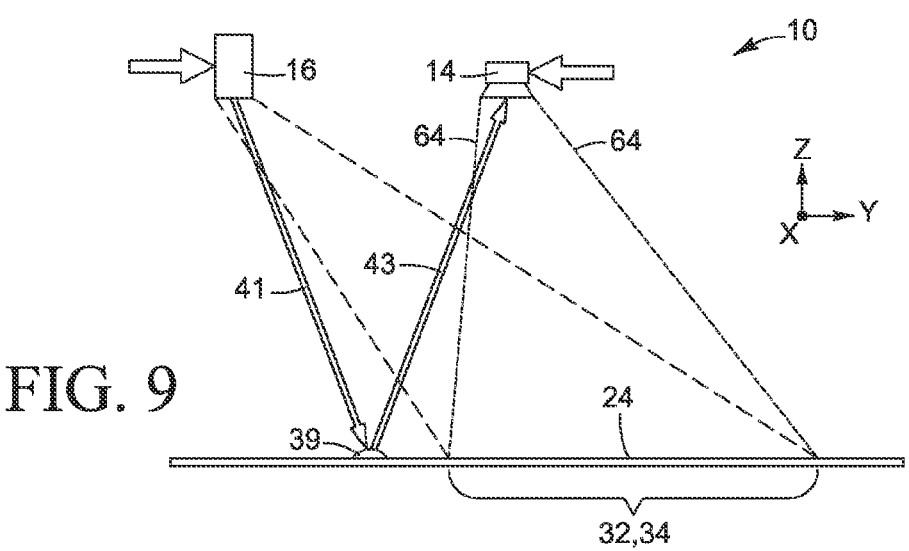
Figure 10:
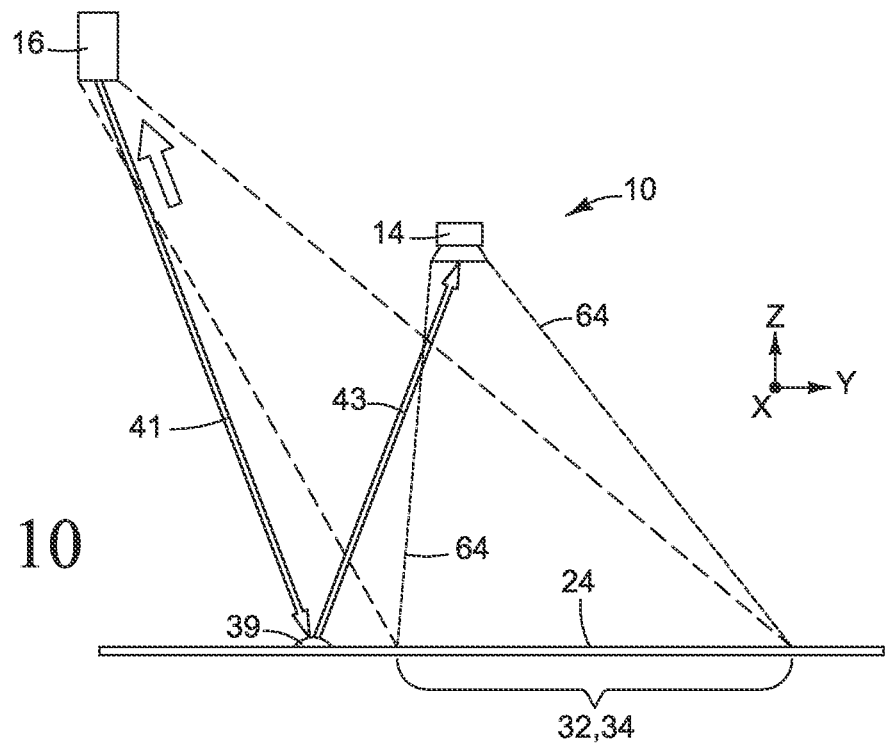
Figure 11:
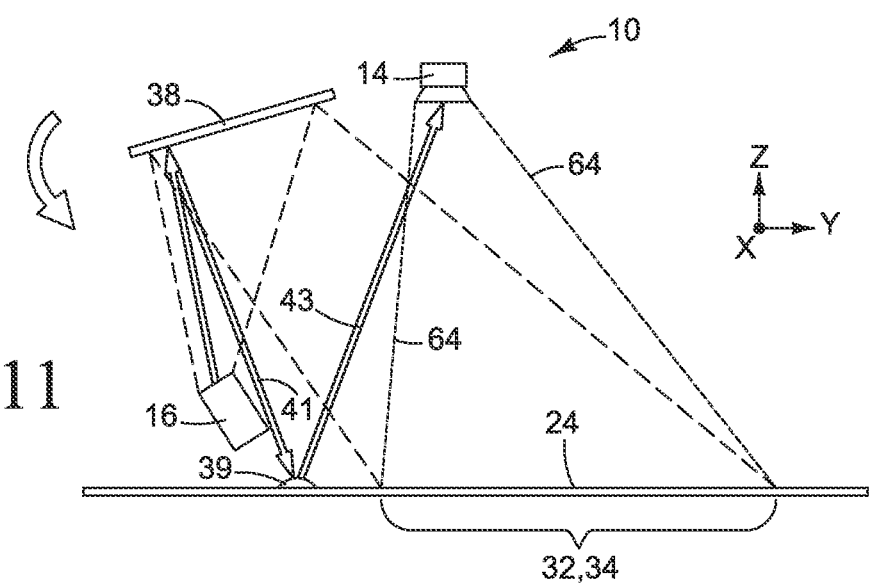

Moving camera 14 off center over capture area 32 brings projector 16 in to make the system less broad, as shown in FIG. 9, but the projector lens offset is still too great and the product still top heavy. In the configuration shown in FIG. 10, projector 16 is raised to a height so that it may be brought in close enough for an acceptable lens offset but, of course, the product is now too tall and top heavy. The most desirable solution is a "folded" light path for projector 16, shown in FIGS. 5 and 11, in which the "high and tight" configuration of FIG. 10 is simulated using fold mirror 38. In FIGS. 5 and 11, projector 16 and the upper light path are folded over the reflecting surface of mirror 38 to project the same light path on to work surface 24 as in the configuration of FIG. 10. This folding effect is best seen in FIG. 5 where fold angles $\Theta 1 = \Theta 2$ and $\phi 1 = \phi 2$.

As shown in FIGS. 5 and 6, camera 14 is placed in front of the mirror 38 over workspace 12 so that it does not block the projector's light path. Camera 14 is positioned off center in the Y direction (FIG. 5) as part of the overall geometry to keep glare spot 39 out of capture area 32 with an acceptable offset for both camera 14 and projector 16. Projector 16 is focused on mirror 38 so that light from projector 16 is reflected off mirror 38 into workspace 12. By moving projector 16 down low and introducing a fold mirror 38 into the projector light path, glare spot 39 is kept out of capture area 32 with an acceptable projector offset and system 10 is sufficiently narrow, short and stable (not top heavy) to support a commercially attractive product implementation.

Thus, and referring again to FIGS. 1A, 1B, and 2, the components of system 10 may be housed together as a single device 40. Referring also to FIG. 3, to help implement system 10 as an integrated standalone device 40, controller 18 may include a processor 42, a memory 44, and an input/output 46 housed together in device 40. For this configuration of controller 18, the system programming to control and coordinate the functions of camera 14 and projector 16 may reside substantially on controller memory 44 for execution by processor 42, thus enabling a standalone device 40 and reducing the need for special programming of camera 14 and projector 16. While other configurations are possible, for example where controller 18 is formed in whole or in part using a computer or server remote from camera 14 and projector 16, a compact standalone appliance such as device 40 shown in FIGS. 1A, 1B and 2 offers the user full functionality in an integrated, compact mobile device 40.

Figure 12:
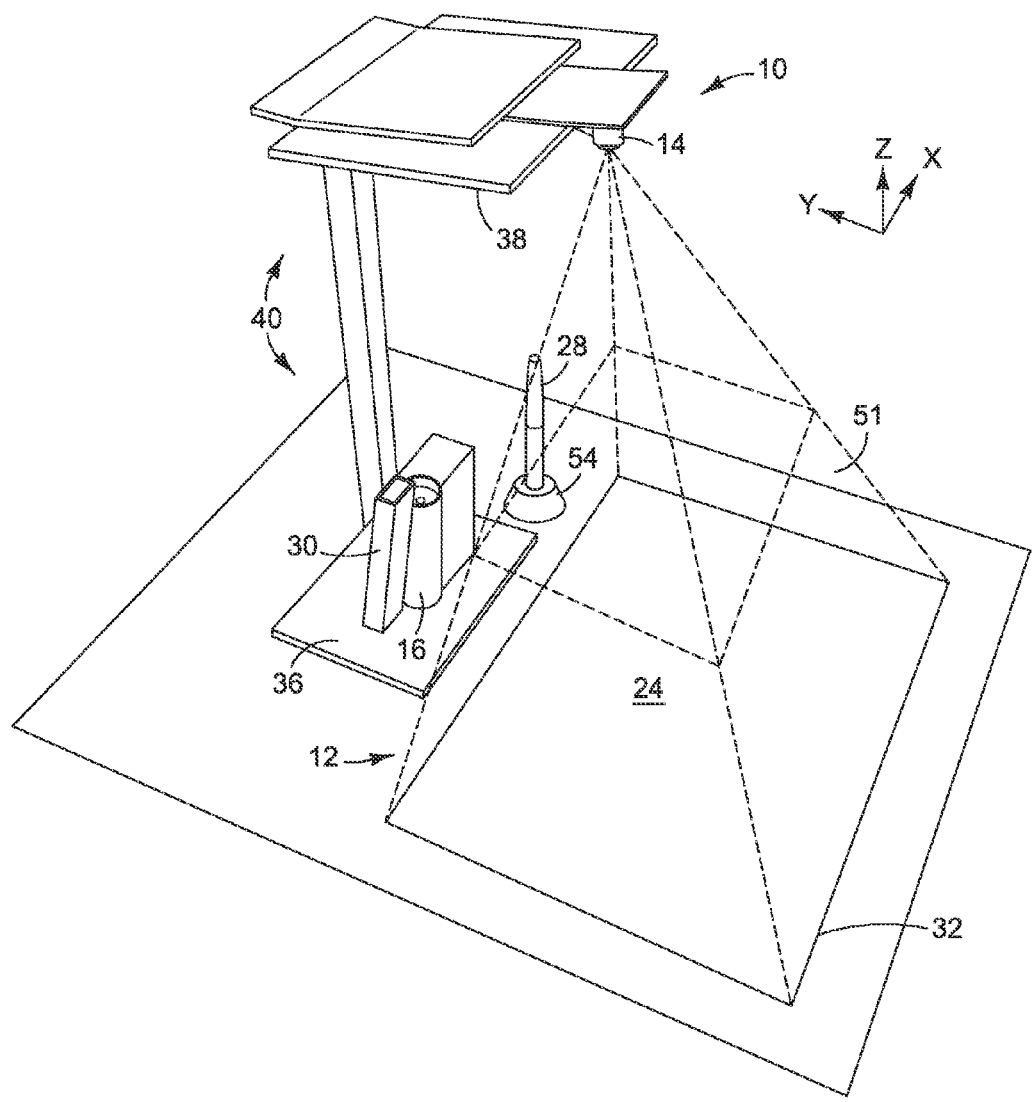
FIGS. 12 and 13 illustrate one example of the camera in the projection capture system shown in FIGS. 2 and 3.

Referring now to FIG. 12, camera 14 is positioned in front of mirror 38 above workspace 12 at a location offset from the center of capture area 32. As noted above, this offset position for camera 14 helps avoid specular glare when photographing objects in workspace 12 without blocking the light path of projector 16. While camera 14 represents generally any suitable digital camera for selectively capturing still and video images in workspace 12, it is expected that a high resolution digital camera will be used in most applications for system 10. A "high resolution" digital camera as used in this document means a camera having a sensor array of at least 12 megapixels. Lower resolution cameras may be acceptable for some basic scan and copy functions, but resolutions below 12 megapixels currently are not adequate to generate a digital image sufficiently detailed for a full range of manipulative and collaborative functions. Small size, high quality digital cameras with high resolution sensors are now quite common and commercially available from a variety of camera makers. A high resolution sensor paired with the high performance digital signal processing (DSP) chips available in many digital cameras affords sufficiently fast image processing times, for example a click-to-preview time of less than a second, to deliver acceptable performance for most system 10 applications.

Figure 13:
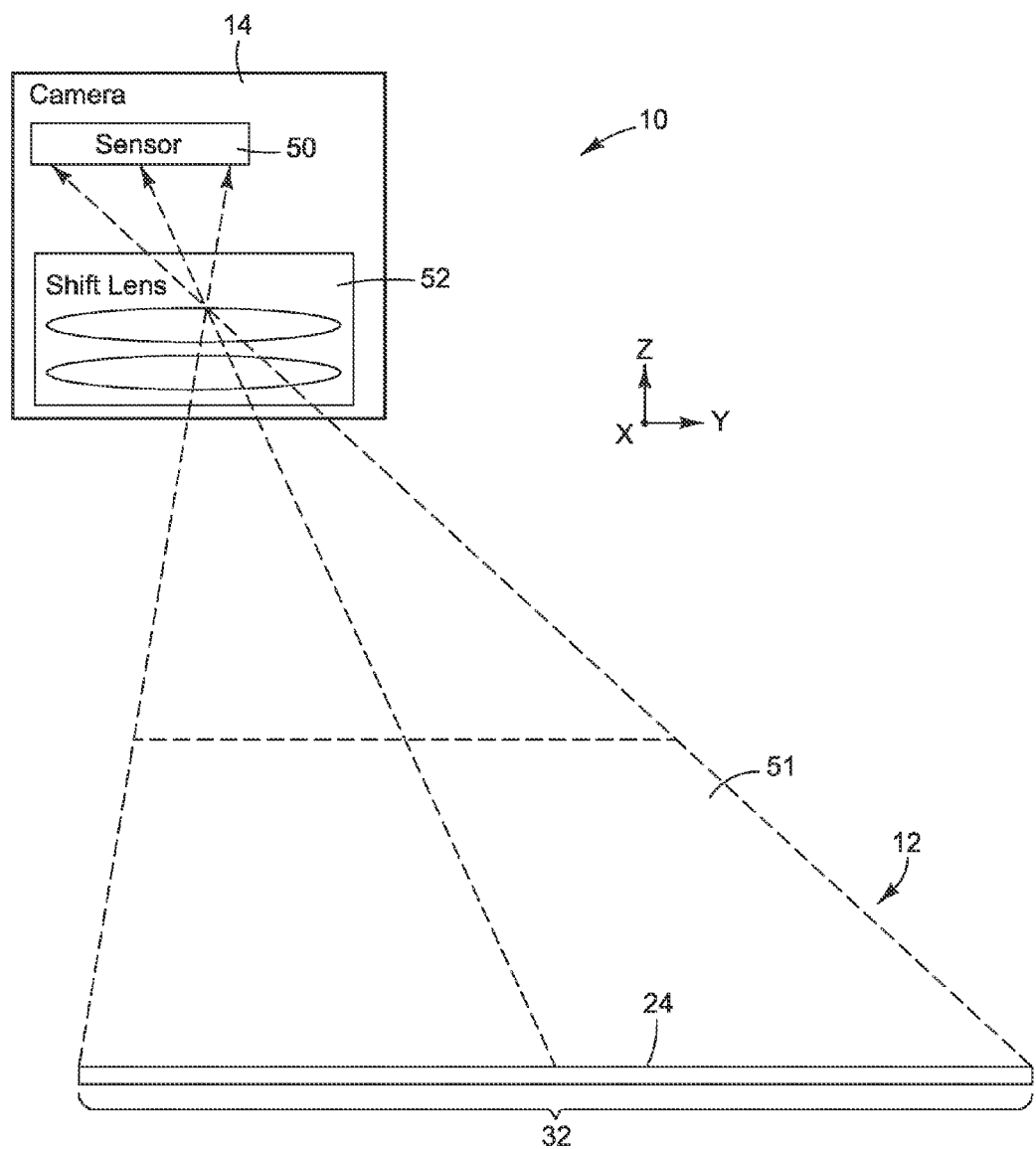

Referring now also to FIG. 13, in the example shown, camera sensor 50 is oriented in a plane parallel to the plane of work surface 24 and light is focused on sensor 50 through a shift lens 52. This configuration for sensor 50 and lens 52 may be used to correct keystone distortion optically, without digital keystone correction in the object image. The field of view of camera 14 defines a three dimensional capture space 51 in work space 12 within which camera 14 can effectively capture images. Capture space 51 is bounded in the X and Y dimensions by camera capture area 32 on work surface 24. Lens 52 may be optimized for a fixed distance, fixed focus, and fixed zoom corresponding to capture space 51.

Figure 14:
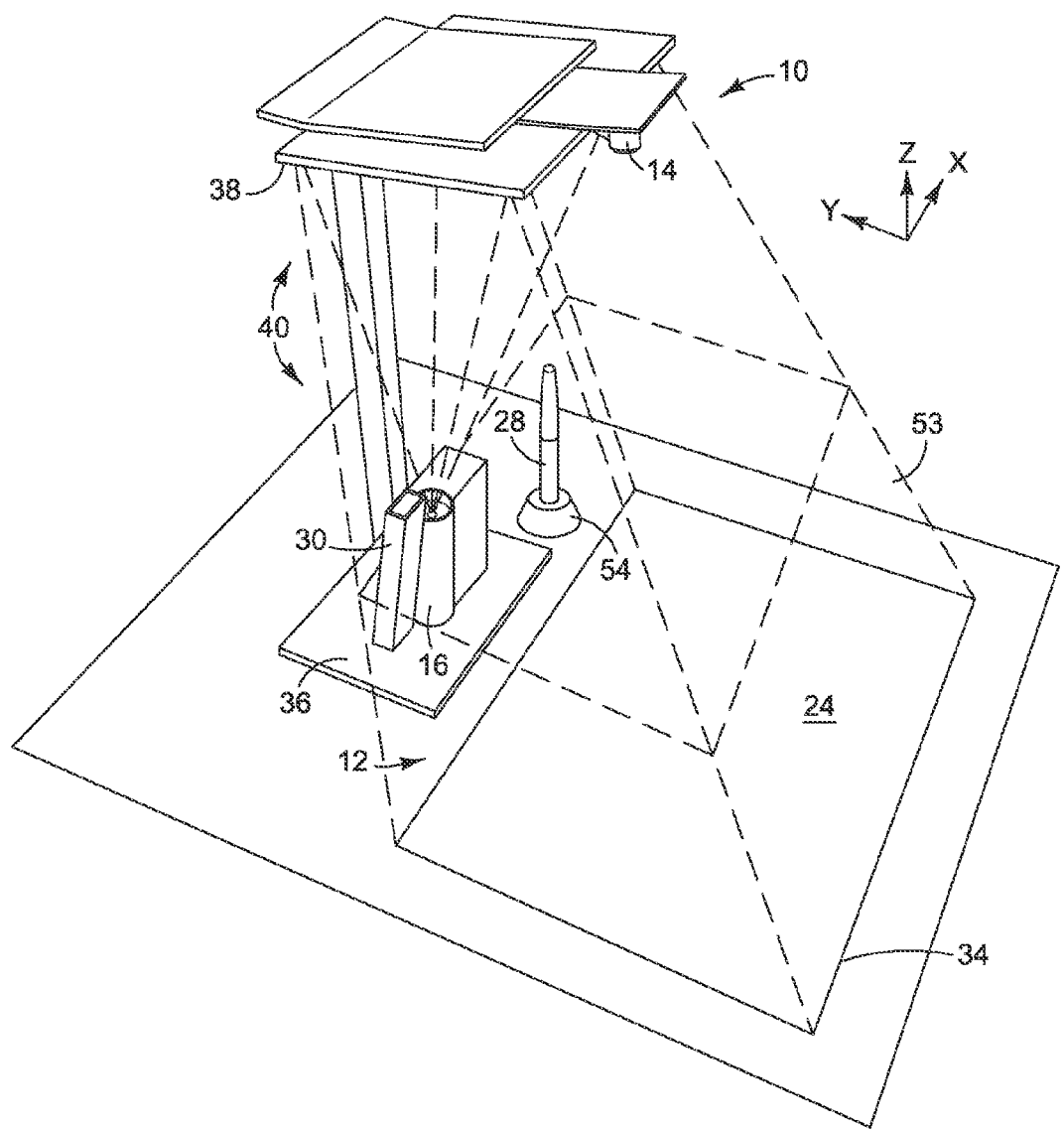
FIG. 14 illustrates one example of the projector in the projection capture system shown in FIGS. 2 and 3.

Referring to FIG. 14, projector 16 is positioned near base 36 outside projector display area 34 and focused on mirror 38 so that light from projector 16 is reflected off mirror 38 into workspace 12. Projector 16 and mirror 38 define a three dimensional display space 53 in workspace 12 within which projector 16 can effectively display images. Projector display space 53 overlaps camera capture space 51 (FIG. 12) and is bounded in the X and Y dimensions by display area 34 on work surface 24. While projector 16 represents generally any suitable light projector, the compact size and power efficiency of an LED or laser based DLP (digital light processing) projector will be desirable for most applications of system 10. Projector 16 may also employ a shift lens to allow for complete optical keystone correction in the projected image. As noted above, the use of mirror 38 increases the length of the projector's effective light path, mimicking an overhead placement of projector 16, while still allowing a commercially reasonable height for an integrated, standalone device 40.

One example of suitable characteristics for system 10 as a standalone device 40 are set out in Table 1. (Dimension references in Table 1 are to FIGS. 5 and 6.)

defects from specular glare. It has been determined that a projector light 200 lumens or greater will be sufficiently bright to swamp out ambient light for the typical desktop application for system 10 and device 40. For video capture and real-time video collaboration, projector 16 shines white light into workspace 12 to illuminate object(s) 20. For an LED projector 16, the time sequencing of the red, green, and blue LED's that make up the white light are synchronized with the video frame rate of camera 14. The refresh rate of projector 16 and each LED sub-frame refresh period should be an integral number of the camera's exposure time for each captured frame to avoid "rainbow banding" and other unwanted effects in the video image. Also, the camera's video frame rate should be synchronized with the frequency of any ambient fluorescent lighting that typically flickers at twice the AC line frequency (e.g., 120 Hz for a 60 Hz AC power line). An ambient light sensor can be used to sense the ambient light frequency and adjust the video frame rate for camera 14 accordingly. For still image capture, the projector's red, green, and blue LED's can be turned on simultaneously for the camera flash to increase light brightness in workspace 12, helping swamp out ambient light and allowing faster shutter speeds and/or smaller apertures to reduce noise in the image.

The example configuration for system 10 integrated into a standalone device 40 shown in the figures and described above achieves a desirable balance among product size, performance, usability, and cost. The folded light path for projector 16 reduces the height of device 40 while maintaining an effective placement of the projector high above workspace 12 to prevent specular glare in the capture area of camera 12. The projector's light path shines on a horizontal work surface 24 at a steep angle enabling 3D object image capture. This combination of a longer light path and steep angle minimizes the light fall off across the capture area to maximize the light uniformity for camera flash. In addition, the folded light path enables the placement of projector 16 near base 36 for product stability.

TABLE 1

| | CAMERA | | | | PROJECTOR | | |
|---|---|---|---|---|---|---|---|
| | Sensor Mpixel | 12 | Mp | | | | |
| | Sensor aspect ratio X/Y | 1.333 | | | | | |
| | Pixel size | .00175 | mm | | | | |
| CX | Object full size X | 427 | mm | PX | Illum Full-field X | 310 | mm |
| CY | Object full size Y | 320 | mm | PY | Illum Full-field Y | 310 | mm |
| CH | Camera height | 450 | mm | PH | Projector height | 670 | mm |
| CS | Camera shift in Y | 150 | mm | PS | Projector shift in Y | 330 | mm |
| | Magnification$^{-1}$ | 66 | | | | | |
| | Sensor pixels X | 4016 | | | Lens offset | 216% | |
| | Sensor pixels Y | 3016 | | | Lens shift | 108% | |
| | Sensor size X | 7.028 | mm | | Max Y-fan angle | 35.76 | deg |
| | Sensor size Y | 5.278 | mm | | Min Y-fan angle | 14.84 | deg |
| | Image size X | 6.470 | mm | | Half-field X | 203.5 | mm |
| | Image size Y | 4.848 | mm | | Half-field Y | 482.5 | mm |
| | Half-field X | 213.5 | mm | | Throw ratio | 1.65 | |
| | Half-field Y | 280 | mm | | Max throw angle | 38.01 | deg |
| | Full-field angle | 76.08 | deg | CC | Camera clearance distance | 51.6 | mm |
| | Sampling resolution | 220 | ppi | GC | Glare spot clearance distance | 44.4 | mm |
| | Capture length X | 464.85 | mm | | | | |
| | Capture length Y | 348.35 | mm | | | | |

Since projector 16 acts as the light source for camera 12 for still and video capture, the projector light must be bright enough to swamp out any ambient light that might cause Suitable input devices and techniques for use in system 10 include, for example, finger touch, touch gestures, stylus, in-air gestures, voice recognition, head tracking and eye tracking. A touch pad can be used to enable a multi-touch interface for navigating a graphical user interface or performing intuitive gesture actions like push, flick, swipe, scroll, pinch-to-zoom, and two-finger-rotate. Depth cameras using structured light, time-of-flight, disturbed light pattern, or stereoscopic vision might also be used to enable in-air gesturing or limited touch and touch gesture detection without a touch pad. A touch-free digital stylus is particularly well suited as a user input 26 for system 10. Thus, in the example shown in the figures, user input 26 includes an infrared digital stylus 28 and an infrared camera 30 for detecting stylus 28 in workspace 12. As noted above, a touch-free digital stylus has the advantage of allowing input in three dimensions, including along work surface 24, without a sensing pad or other special surface.

Figure 15:
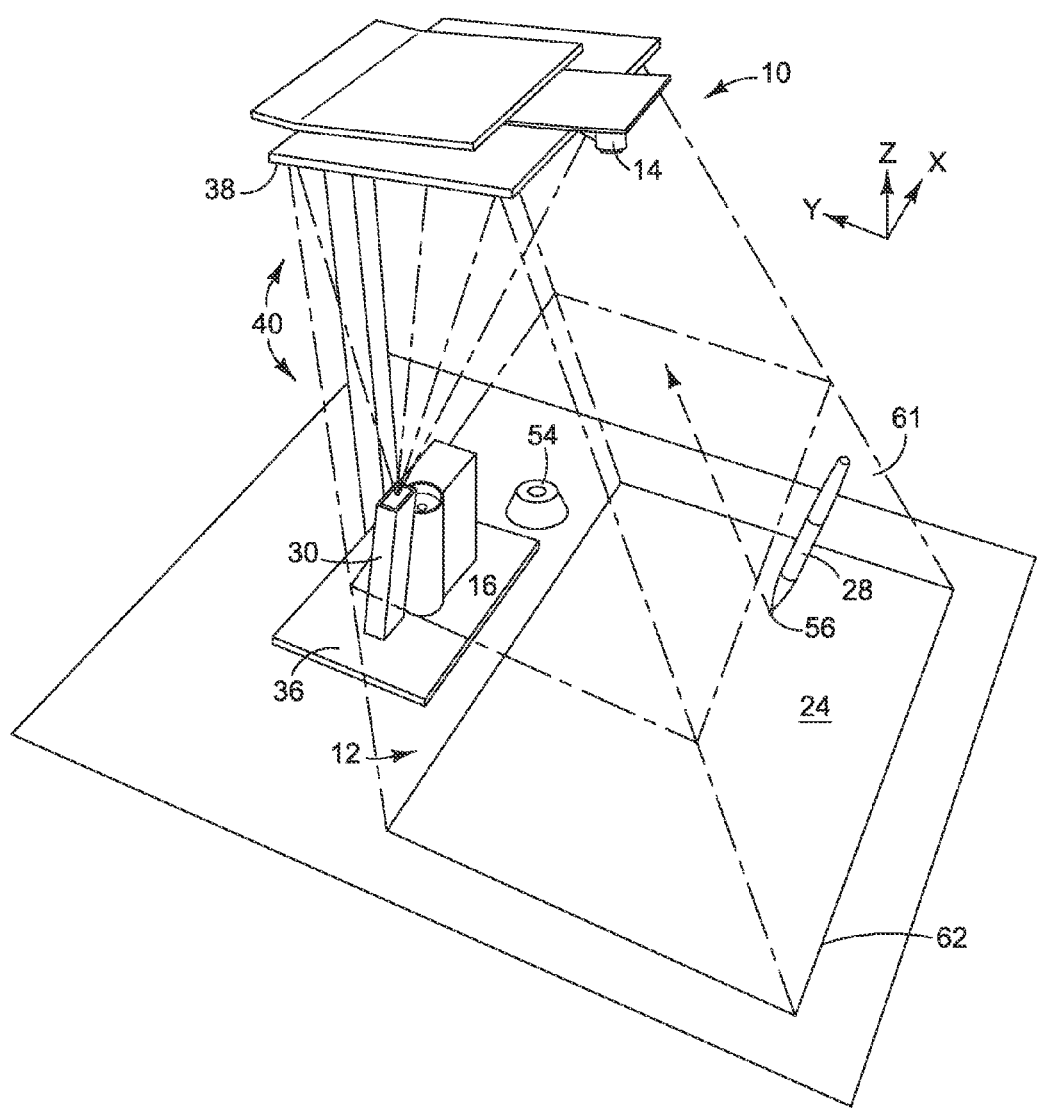
FIGS. 15 and 16 illustrate examples of the user input device in the projection capture system shown in FIGS. 2 and 3.

Referring now to FIGS. 4 and 15, input device 26 includes infrared stylus 28, infrared camera 30 and a stylus charging dock 54. Stylus 28 includes an infrared light 56, a touch sensitive nib switch 58 to turn on and off light 56 automatically based on touch, and a manual on/off switch 60 to manually turn on and off light 56. (Nib switch 58 and manual switch 60 are shown in the block diagram of FIG. 4.) Light 56 may be positioned, for example, in the tip of stylus 28 as shown in FIG. 15 to help maintain a clear line-of-sight between camera 30 and light 56. Light 56 may also emit visible light to help the user determine if the light is on or off.

Nib switch 58 may be touch sensitive to about 2 gr of force, for example, to simulate a traditional writing instrument. When the stylus's nib touches work surface 24 or another object, nib switch 58 detects the contact and turns on light 56. Light 56 turning on is detected by camera 30 which signals a touch contact event (similar to a mouse button click or a finger touch on a touch pad). Camera 30 continues to signal contact, tracking any movement of stylus 28, as long as light 56 stays on. The user can slide stylus 28 around on any surface like a pen to trace the surface or to activate control functions. When the stylus nib is no longer in contact with an object, light 56 is switched off and camera 30 signals no contact. Manual light switch 60 may be used to signal a non-touching event. For example, when working in a three dimensional workspace 12 the user may wish to modify, alter, or otherwise manipulate a projected image above work surface 24 by manually signaling a "virtual" contact event.

Infrared camera 30 and mirror 38 define a three dimensional infrared capture space 61 in workspace 12 within which infrared camera 30 can effectively detect light from stylus 28. Capture space 61 is bounded in the X and Y dimensions by an infrared camera capture area 62 on work surface 24. In the example shown, as best seen by comparing FIGS. 14 and 15, infrared camera capture space 61 is coextensive with projector display space 53. Thus, infrared camera 30 may capture stylus activation anywhere in display space 53.

Figure 16:
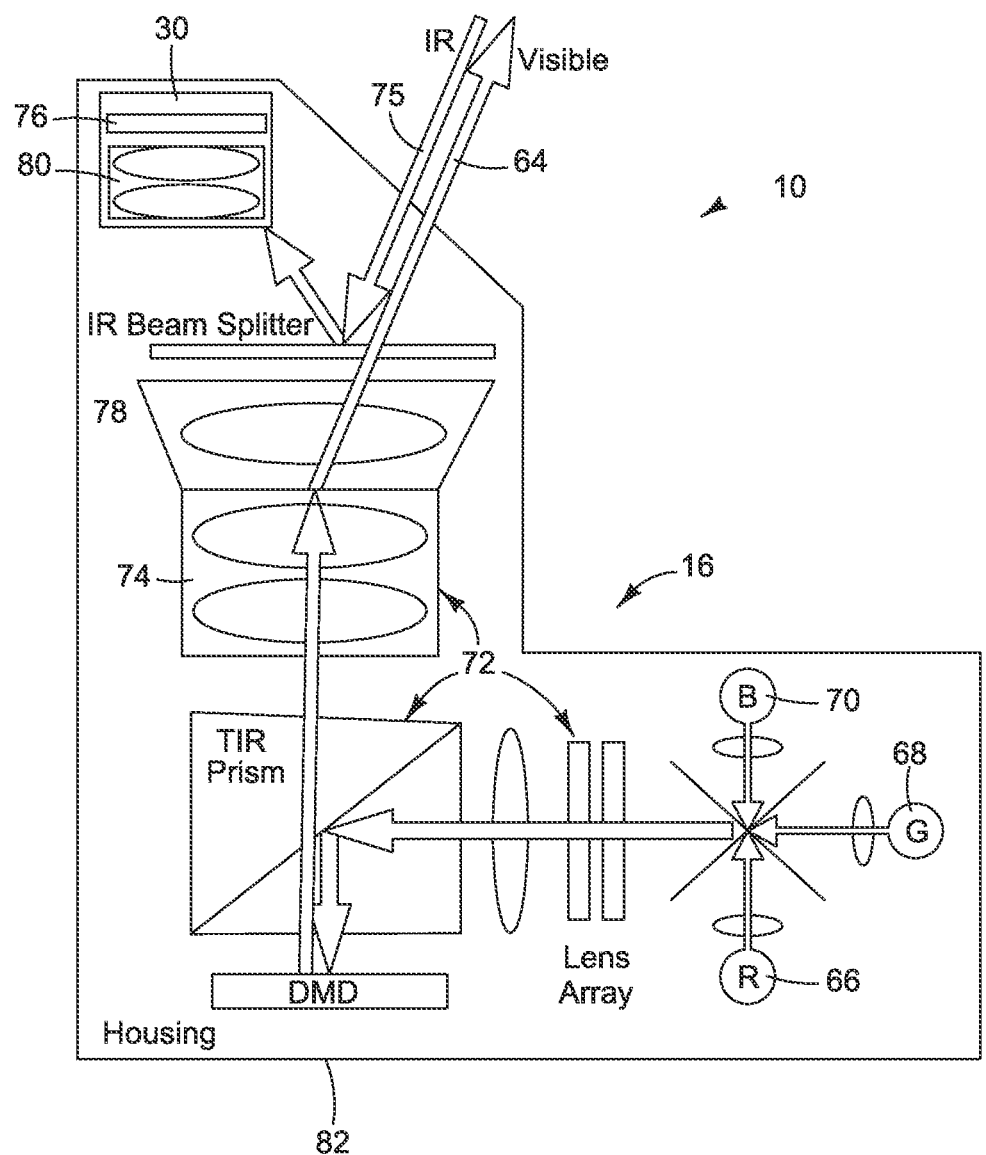

In one example implementation shown in FIG. 16, camera 30 is integrated into the projection light path such that the projector field-of-view and the infrared camera field-of-view are coincident to help make sure stylus 28 and thus the tracking signal from infrared camera 30 is properly aligned with the projector display anywhere in workspace 12. Referring to FIG. 16, visible light 64 generated by red, green and blue LEDs 66, 68, and 70 in projector 16 passes through various optics 72 (including a shift lens 74) out to mirror 38 (FIG. 14). Infrared light 75 from stylus 28 in workspace 12 reflected off mirror 38 toward projector 16 is directed to infrared camera sensor 76 by an infrared beam splitter 78 through a shift lens 80. (Similar to the example configuration for camera 14 described above, infrared light sensor 76 for camera 30 may be oriented in a plane parallel to the plane of work surface 24 and light focused on sensor 76 through shift lens 80 for full optical keystone correction.)

It may be desirable for some commercial implementations to house projector 16 and infrared camera 30 together in a single housing 82 as shown in FIG. 16. The geometrical configuration for infrared camera 30 shown in FIG. 16 helps insure that the stylus tracking signal is aligned with the display no matter what height stylus 28 is above work surface 24. If the projector field-of-view and the infrared camera field-of-view are not coincident, it may be difficult to calibrate the stylus tracking at more than one height above work surface 24, creating the risk of a parallax shift between the desired stylus input position and the resultant displayed position.

Although it is expected that workspace 12 usually will include a physical work surface 24 for supporting an object 20, work space 12 could also be implemented as a wholly projected work space without a physical work surface. In addition, workspace 12 may be implemented as a three dimensional workspace for working with two and three dimensional objects or as a two dimensional workspace for working with only two dimensional objects. While the configuration of workspace 12 usually will be determined largely by the hardware and programming elements of system 10, the configuration of workspace 12 can also be affected by the characteristics of a physical work surface 24. Thus, in some examples for system 10 and device 40 it may be appropriate to consider that workspace 12 is part of system 10 in the sense that the virtual workspace accompanies system 10 to be manifested in a physical workspace when device 36 is operational, and in other examples it may be appropriate to consider that workspace 12 is not part of system 10.

Figure 17:
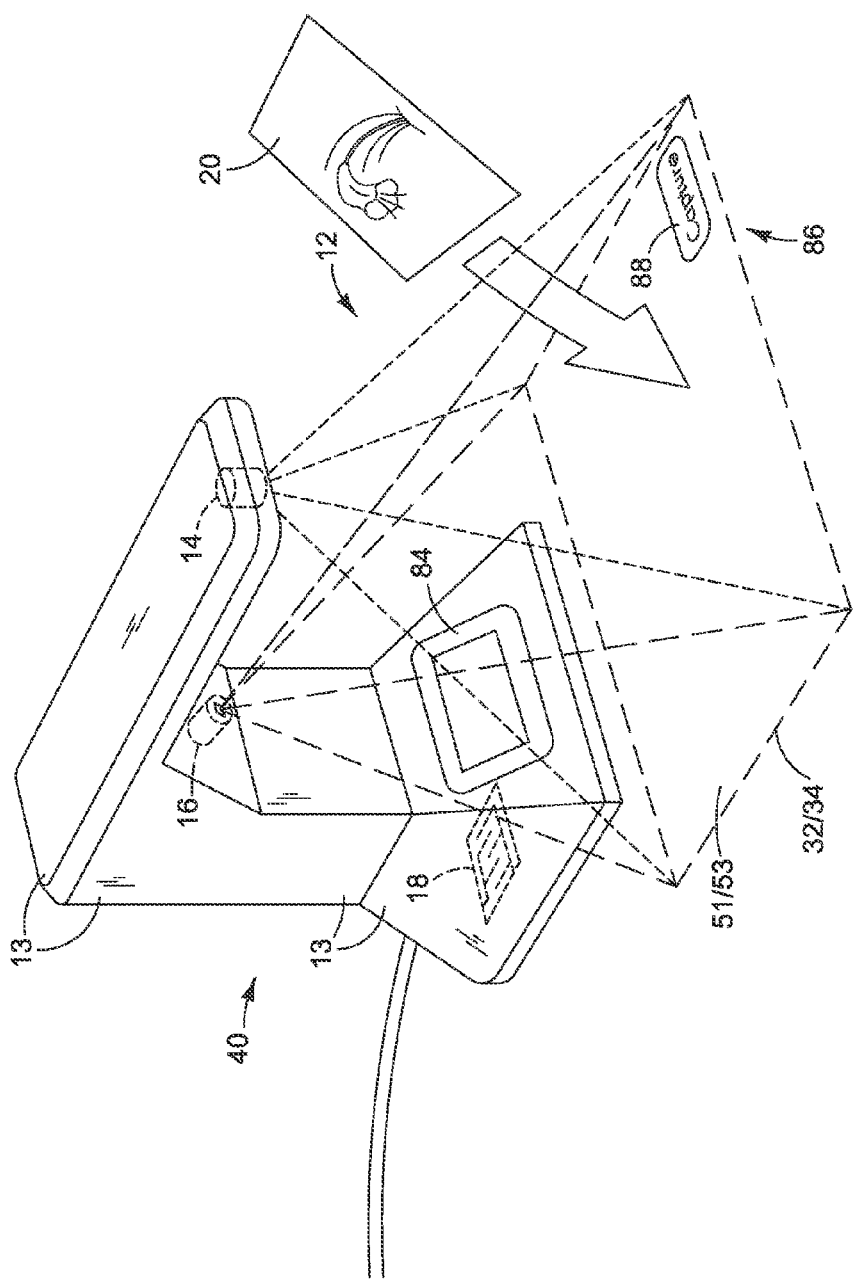
FIGS. 17-19 are perspective views illustrating a new portable projection capture device, according to another example of the invention.
Figure 18:
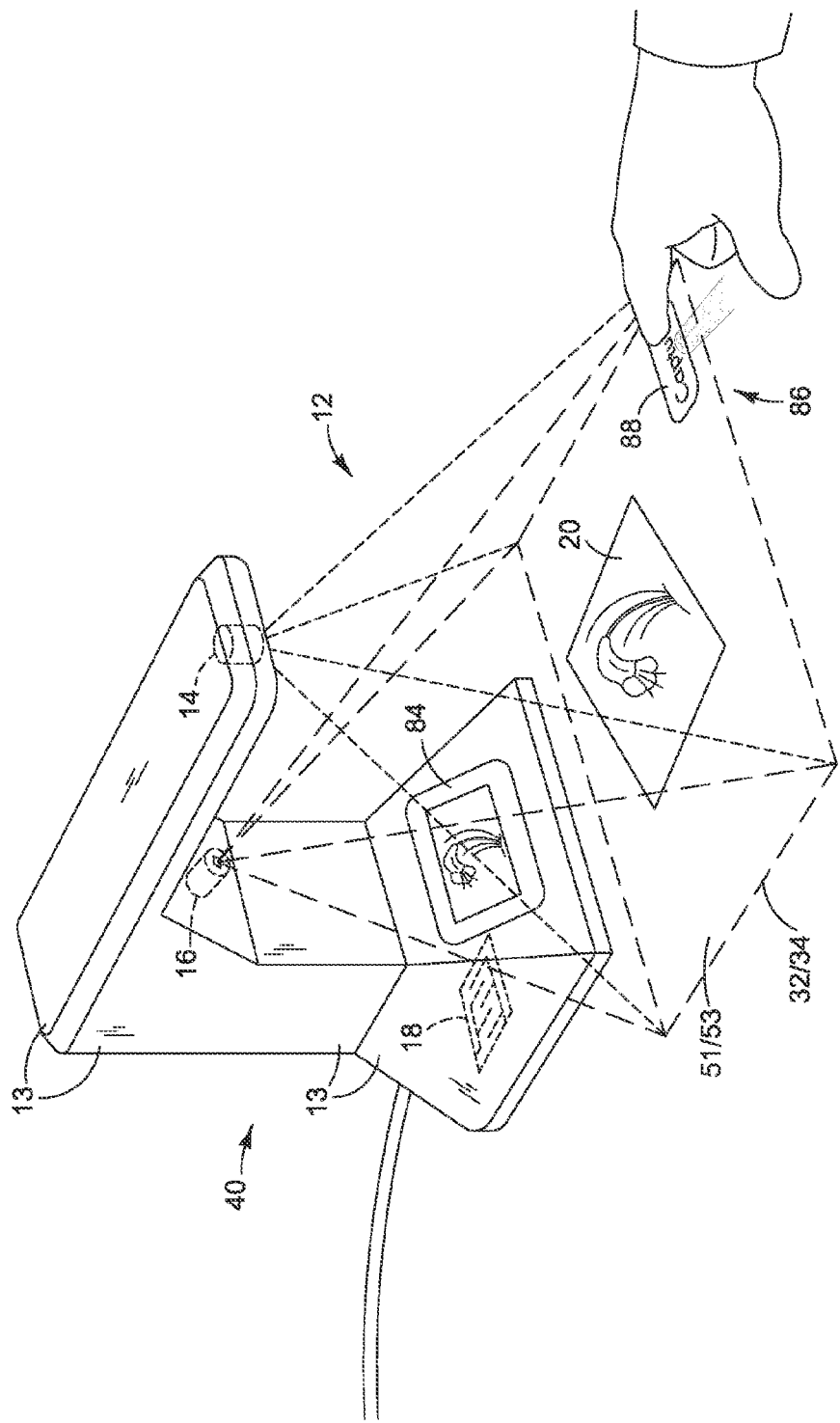
Figure 19:
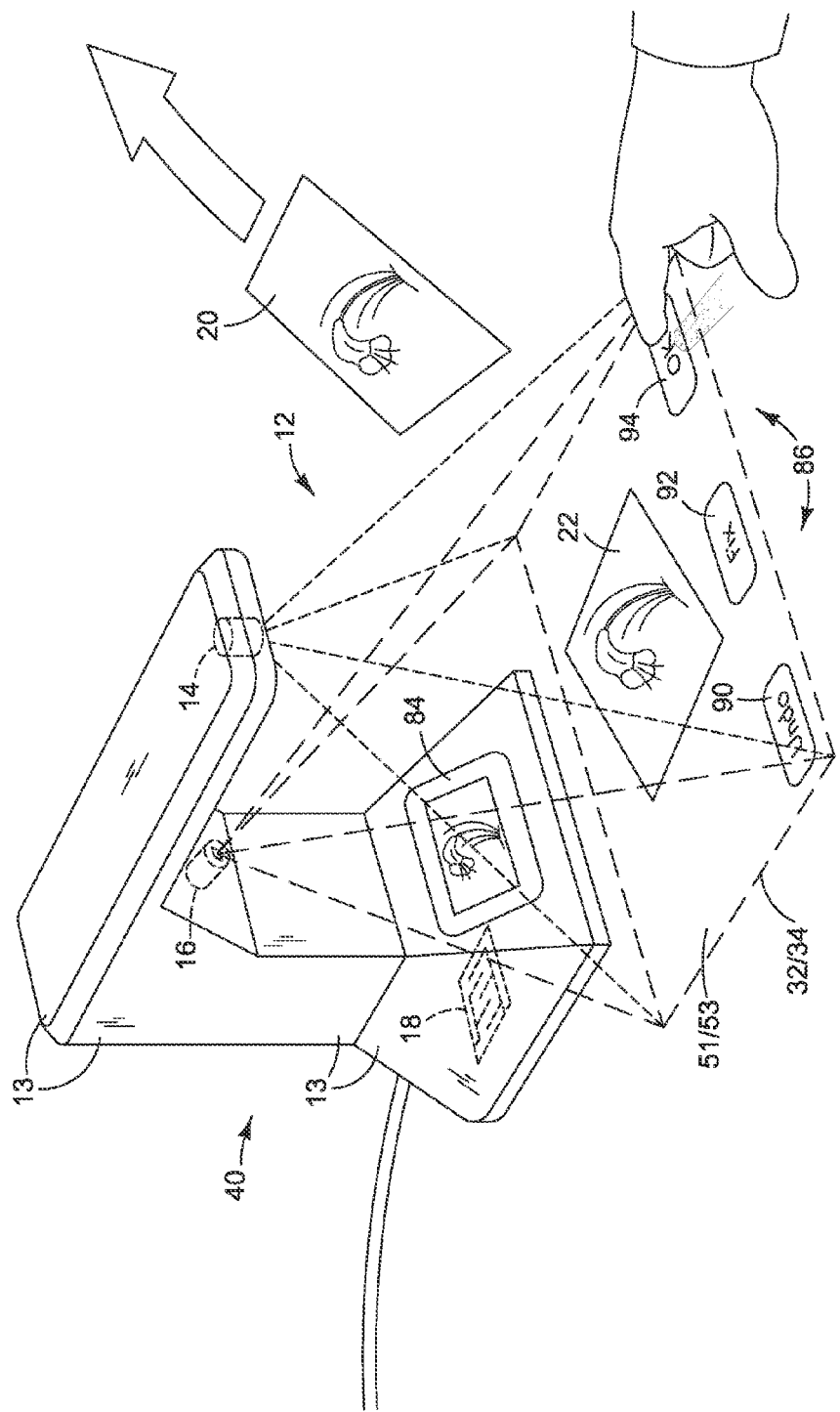

FIGS. 17-19 are perspective views illustrating another example of a portable projection capture device 40 and an interactive workspace 12 associated with device 40. Referring to FIGS. 17-19, portable device 40 includes a digital camera 14 for capturing still and video images of an object 20 in capture area 32 (and in capture space 51) and a projector 16 for illuminating an object in capture area 32 (and capture space 51) and for projecting images onto display area 34 (and into a display space 53). A two dimensional object 20 (a hardcopy photograph) placed in capture area 32 has been photographed by camera 14 (FIGS. 17 and 18), object 20 removed from capture area 32, and an object image 22 projected onto display area 34 (FIG. 19) where it can be photographed by camera 14 and/or otherwise manipulated by a user.

In this example, device 40 also includes an electronic display 84 for selectively displaying a live feed from camera 14, an image previously captured by camera 14, or the representation of an image as it is manipulated by the user through a graphical user interface (GUI) 86 projected into display space 53. (GUI 86 is projected onto display area 32 in the example shown in FIGS. 17-19.) Camera 14, projector 16, and display 84 are operatively connected together through a controller 18 and housed together in housing 13 as a single portable device 40. Projector 16 is positioned below camera 14 high in housing 13 to project light directly into display space 53 and on to display area 34. Projector display space 53 and display area 34 overlap camera capture space 51 and capture area 32 so that projector 16 can serve as the light source for camera 14 capturing images of real objects 20 in space 51 and on area 32 and so that camera 14 can capture images of images 20 projected into space 51 and on area 32.

Controller 18 is programmed to generate and projector 16 projects a GUI 86 that includes, for example, device control "buttons" such as Capture button 88 in FIGS. 17 and 18 and Undo, Fix, and OK buttons 90, 92, and 94, respectively, in FIG. 19. Although device 40 in FIGS. 17-19 might also include a more complex GUI and corresponding control programming in controller 18, as well as other user input device(s), the device configuration of FIGS. 17-19 illustrates basic digital copying and image manipulation functions more suitable for a less expensive consumer desktop product market.

The examples of system 10 and device 40 shown in the figures, with one camera 14 and one projector 16, do not preclude the use of two or more cameras 14 and/or two or more projectors 16. Indeed, it may be desirable in some applications for a system 10 and device 40 to include more than one camera, more than one projector or more than one of other system components. Thus, the articles "a" and "an" as used in this document mean one or more.

As noted at the beginning of this Description, the examples shown in the figures and described above illustrate but do not limit the invention. Other examples, embodiments and implementations are possible. Therefore, the foregoing description should not be construed to limit the scope of the invention, which is defined in the following claims.

What is claimed is:

1. A projection capture device comprising:
a camera supported by a base over a flat, horizontal work surface, the camera defining a three dimensional capture space bounded in two dimensions by a capture area on the work surface within which a camera sensor included in the camera is to capture visible light of images focused on the camera sensor by a shift lens included in the camera that shifts the visible light of still and video images in a Y-direction relative to the camera sensor, wherein the camera is positioned in a Z-direction over the capture area at a location offset in at least the Y-direction from a center of the capture area with the camera sensor facing the capture area;
a projector supported by the base below the camera, the projector defining a three dimensional display space bounded in two dimensions by a display area on the work surface overlapping at least part of the capture area; and
a controller supported by the base to: with the projector, illuminate objects in the capture space; with the camera, capture visible light of images of objects in the capture space illuminated by the projector; and, with the projector, project visible light representative of the images of the objects captured by the camera into the display space;
a mirror positioned in the Z-direction over the capture space, and wherein the camera is placed in front of the mirror so that it does not block the projector's light path.

2. The device of claim 1, further comprising a housing having a first part housing the camera over the base and a second part housing the projector and the controller on the base.

3. The device of claim 2, further comprising a mirror housed together with the camera in the first part of the housing, the projector and the mirror positioned with respect to one another such that light from the projector reflected off the mirror illuminates the capture space.

4. The device of claim 1, wherein the projector is to project white light of at least 200 lumens into the capture area with red, green and blue light emitting diodes (LEDs) synchronized with a video frame rate of the camera.

5. The device of claim 4, wherein a refresh rate of the projector and a refresh period of each LED sub-frame is an integral number of an exposure time of the camera for each captured frame.

6. The device of claim 1, wherein the projector is positioned below the camera outside a volume bounded in two dimensions by the display area.

7. The device of claim 6, wherein the projector is to project light into the display area along a light path that is longer than a height of the camera above the work surface.

8. The device of claim 1, wherein the camera and the projector are operatively connected to one another through the controller to project a graphical user interface into the display space.

9. The device of claim 1, further comprising an electronic display housed together with the controller, the projector and the camera, the display operatively connected to the controller to display an image captured by the camera.

10. The device of claim 1 further comprising a user input device operatively connected to the controller to enable a user to interact with the device in the display space.

11. The device of claim 10, wherein the user input device includes an infrared digital stylus and an infrared camera housed together with the controller, the projector, and the camera for capturing infrared light emitted by the stylus in a capture space of the infrared camera that is coincident with the display space.

12. The device of claim 11, wherein the infrared camera is integrated into the light path of the projector light such that a field-of-view of the projector and a field-of-view of the infrared camera are coincident.

* * * * *